US006008826A

United States Patent [19]

Foote et al.

[11] Patent Number: 6,008,826

[45] Date of Patent: Dec. 28, 1999

[54] APPARATUS AND METHOD FOR OBTAINING COLOR PLANE ALIGNMENT IN A SINGLE PASS COLOR PRINTER

[75] Inventors: Wayne E. Foote, Eagle; David J. Arcaro, Boise, both of Id.

[73] Assignee: Hewlett-Packard Company, Palo Alto, Calif.

[21] Appl. No.: 09/044,513

[22] Filed: Mar. 18, 1998

[51] Int. Cl.$^{6}$ .......... B41J 2/385; G01D 15/06; G03G 15/01

[52] U.S. Cl. .......... 347/116; 347/248; 399/301

[58] Field of Search .......... 399/40, 49, 51, 399/72, 298, 299, 301, 303; 347/116–118, 234, 248

[56] References Cited

U.S. PATENT DOCUMENTS

| | | | |
|---|---|---|---|
| 5,287,162 | 2/1994 | De Jong et al. | 399/49 |
| 5,339,150 | 8/1994 | Hubble, III et al. | 399/49 |
| 5,384,592 | 1/1995 | Wong | 347/116 |
| 5,452,073 | 9/1995 | Kataoka | 347/116 X |
| 5,523,823 | 6/1996 | Ashikaga | 347/116 X |
| 5,576,753 | 11/1996 | Kataoka et al. | 347/248 |
| 5,715,498 | 2/1998 | Takeuchi et al. | 399/40 |
| 5,854,958 | 12/1998 | Tanimoto et al. | 399/49 |
| 5,875,380 | 2/1999 | Iwata et al. | 399/301 X |

*Primary Examiner*—William J. Royer

[57] ABSTRACT

A system for controlling color plane image alignment in a multi-color, single pass laser printer achieves such alignment by imprinting of alignment marks directly on a belt which carries and/or drives media sheets past plural developer modules in a process direction. A pair of sensors are positioned adjacent the belt to enable a sensing of the alignment marks. A controller causes each of a plurality of developers to print a set of alignment marks on the belt, each set including plural marks that are positioned transverse to a print process direction. The controller, in response to the sensors' detecting the printed marks on the belt, determines times at which the marks pass beneath the sensors and, from such determined times, derives variations from expected sense times of the marks of each set. Thereafter, the controller adjusts data feed from color plane sub-images to one or more laser scanners in such a manner as to reduce color plane image misalignments.

7 Claims, 6 Drawing Sheets

APPARATUS AND METHOD FOR OBTAINING COLOR PLANE ALIGNMENT IN A SINGLE PASS COLOR PRINTER

FIELD OF THE INVENTION

This invention relates to single pass multi-color laser printers and, more particularly, to a method and apparatus for achieving alignment of color plane images in such multi-color laser printers.

BACKGROUND OF THE INVENTION

Difficulties in achieving precise color plane alignments have hindered development of multi-color laser printers which employ single pass color printing processes. Subimages derived from color image planes must be precisely positioned, relative to each other, or else substantial image degradation results. For example, a subimage misalignment that exceeds about 50 microns produces a detectable degradation in print quality.

Alignment of subimages is difficult to achieve in single pass color printers because precise alignment of the multiple imaging sources is required. Such alignments are subject to change with temperature variations, consumable servicing, printer handling, etc.

Various methods have been proposed to reduce color plane alignment errors in single pass color printers. U.S. Pat. No. 5,287,162 to de Jong et al. describes a method and apparatus for correction of color alignment errors in such a printer. deJong et al. print plural chevrons on an intermediate photoreceptor belt or on a media sheet carried by a copy sheet conveyor. In order to achieve correction values for color alignment errors, de Jong et al. employ plural sensors, one for each color chevron that is printed and sense the relative positions of the chevrons. To achieve proper alignment correction values, each detector and its control circuitry is required to determine a centroid of each arm of a chevron being sensed.

U.S. Pat. No. 5,339,150 to Hubble, III et al. describes a mark detection circuit for a multi-color, single pass, electrophotographic printer, wherein alignment marks are employed to achieve color plane subimage alignment. In one embodiment, Hubble, III et al. use four LED print bars to form a composite color image on a media sheet. A photosensor is placed beneath each print bar and a narrow target line is formed on the belt surface a few scan lines before the start of an exposure frame. The center of the target line is detected by each sensor which produces a corresponding detection signal. More specifically, the system includes multiple sensors placed at each print bar to detect the passage of alignment marks produced by the first print bar. An output signal is generated at each of the three downstream print bars, with the signals being utilized to commence image exposure sequence operations in synchronism with the first image exposure.

In another embodiment, Hubble, III et al enable skew alignment adjustments by forming marks on opposite sides of the photoreceptor, detecting the center of each mark and making adjustments of the position of the downstream print bars, based on detected time differences between opposed marks.

As indicated above, both de Jong et al. and Hubble, III et al. require multiple sensors to enable image alignment in a multicolor printer. Such multiple sensors, and the control circuitry associated with each sensor, add to the cost of the printer. Further, both de Jong et al. and Hubble, III et al. apply their respective marks to either a photoreceptor that is used as an intermediate carrier or directly to print media, the latter requiring a special feed of the print media through the printer to achieve an image alignment action.

It is an object of this invention to provide an improved system and method for subimage color plane alignment in a single pass, color printer.

It is another object of this invention to provide an improved system for subimage color plane alignment in a laser printer, wherein only two alignment mark sensors are required.

It is a further object of this invention to provide an improved method for subimage color plane alignment in a single pass laser printer, wherein such alignment is enabled by the printing of alignment marks directly on a media sheet-carrying belt, obviating the need for use of an intermediate transfer medium.

SUMMARY OF THE INVENTION

A system for controlling color plane image alignment in a multi-color, single pass laser printer achieves such alignment by imprinting of alignment marks directly on a belt which carries and/or drives media sheets past plural developer modules in a process direction. A pair of sensors are positioned adjacent the belt to enable sensing of the alignment marks. A controller causes each of a plurality of developers to print a set of alignment marks on the belt, each set including plural marks that are positioned transverse to a print process direction. The controller, in response to the sensors' detecting the printed marks on the belt, determines times at which the marks pass beneath the sensors and, from such determined times, derives variations from expected sense times of the marks of each set. Thereafter, the controller adjusts data feed from color plane sub-images to one or more laser scanners in such a manner as to reduce color plane image misalignments.

DETAILED DESCRIPTION OF THE INVENTION

Figure 1:
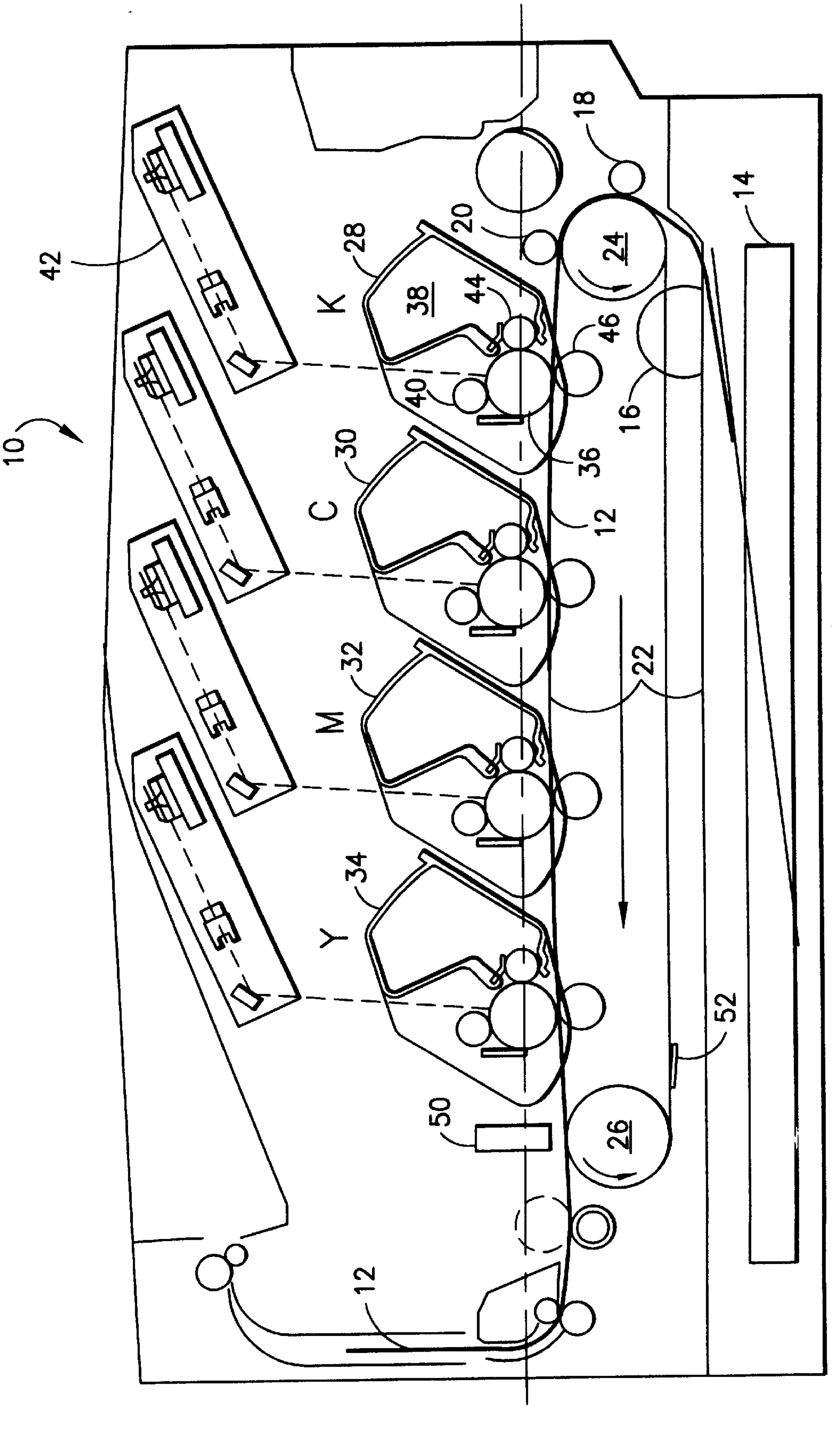
FIG. 1 is a schematic side sectional view of a full color laser print engine.

Referring to FIG. 1, print engine 10 incorporates apparatus for producing full color images on media sheets 12. Each media sheet 12 is selected from a media tray 14 by a pick roller 16 and is grabbed between a pair of follower rollers 18, 20 and a media transport belt 22 (which rides on rollers 24 and 26, respectively). Media transport belt 22 may be either a belt having a width of at least a media sheet or it may be plural, opposed narrow belts which grab opposite sides of a media sheet and propel it through a plurality of developer stations 28, 30, 32 and 34. It is necessary that media transport belt 22 include longitudinal portions which exhibit an insulating surface that is adapted to retain a charge state which will enable an attraction of toner particles from the respective developer stations.

As will be hereafter understood, alignment marks are printed by each of the developer stations directly on media transport belt 22 and enable a control action (to be described below) to alter the positioning of subimages from respective color planes so as to assure proper color plane subimage alignment.

Each of developer stations 28, 30, 32 and 34 is substantially physically identical, except that each contains a different color toner. For instance, developer station 28 includes black toner (K), developer station 30 includes yellow toner (Y), developer station 32 includes magenta toner (M) and developer station 34 contains cyan toner (C). Each developer station further includes an organic photoconductor (OPC) that is positioned on an OPC roller 36. The toner supply for each developer station is maintained within a reservoir 38.

OPC roller 36 is contacted by a charge roller 40 which applies the necessary charge state to OPC roller 36. Thereafter, a laser scanner 42 is controlled to scan OPC roller 36 and to impart charge states thereon in accordance with a particular color plane image. In the case of developer station 28, laser scanner 42 is controlled by data from a black color plane.

As OPC roller 36 rotates the charged image, it passes by a developer roller 44 which, in the known manner, enables toner to be taken up onto the surface of OPC roller 36 in accordance with the charge states resident thereon. Thereafter, the toned image is rotated into contact with a media sheet 12 which is pressed against OPC roller 36 by a transfer roller 46. Each of the additional developer stations operates in a substantially identical manner, using an associated laser scanner.

To this point, the operation of print engine 10 is substantially consistent with full color prior art print engines. Difficulties arise in achieving (in such an engine) alignment of color plane subimages from each developer station. For example, the positioning of each of laser scanners 42 can change as a result of the handling of print engine 10, temperature changes, etc. Further, differences in OPC roller run-out and speed variations thereof can also cause color plane alignment changes.

Accordingly, as will be described in detail below, each laser scanner 42, in combination with its associated developer station, causes the printing of a set of alignment marks directly on media transport belt 22, which alignment marks are sensed by an optical sensor 50 that is positioned downstream from the respective developer stations. Further, as transport belt 22 moves, the alignment marks are removed by a belt cleaner 52 to enable new sets of alignment marks to be imprinted thereupon on a next cycle.

As will be later understood, each developer station imprints four marks on transport belt 22. A first pair of marks (e.g., lines) are printed so that they are adjacent either edge of transport belt 22 and are positioned so as to orient their long dimensions orthogonal to the process direction (i.e., direction of belt movement). A second set of marks, printed by each developer station, include a pair of lines that are positioned along opposed edges of the belt and are oriented at oblique angles to the process direction of transport belt 22. Accordingly, developer stations 28, 30, 32 and 34 imprint a total of sixteen alignment marks on transport belt 22, which alignment marks are sensed by a pair of optical sensors 50, 50' (see FIG. 2). Sense circuitry determines the timing between the sensing of the alignment marks of each pair and the sensing of a pair of alignment marks which are printed by one developer station and serve as reference marks (e.g., the marks from K developer station 28). Error values are derived from the mark timing measurements, which error values are representative of timing differences between (i) expected time intervals between marks and (ii) measured time intervals between marks.

The derived error values are then used to control the rates of data feed that modulate the respective laser scanners so as to correct color plane image misalignments. Importantly, no mechanical adjustments are required to correct for such misalignments, only alterations in timing of data fed to the respective laser scanners.

Figure 2:
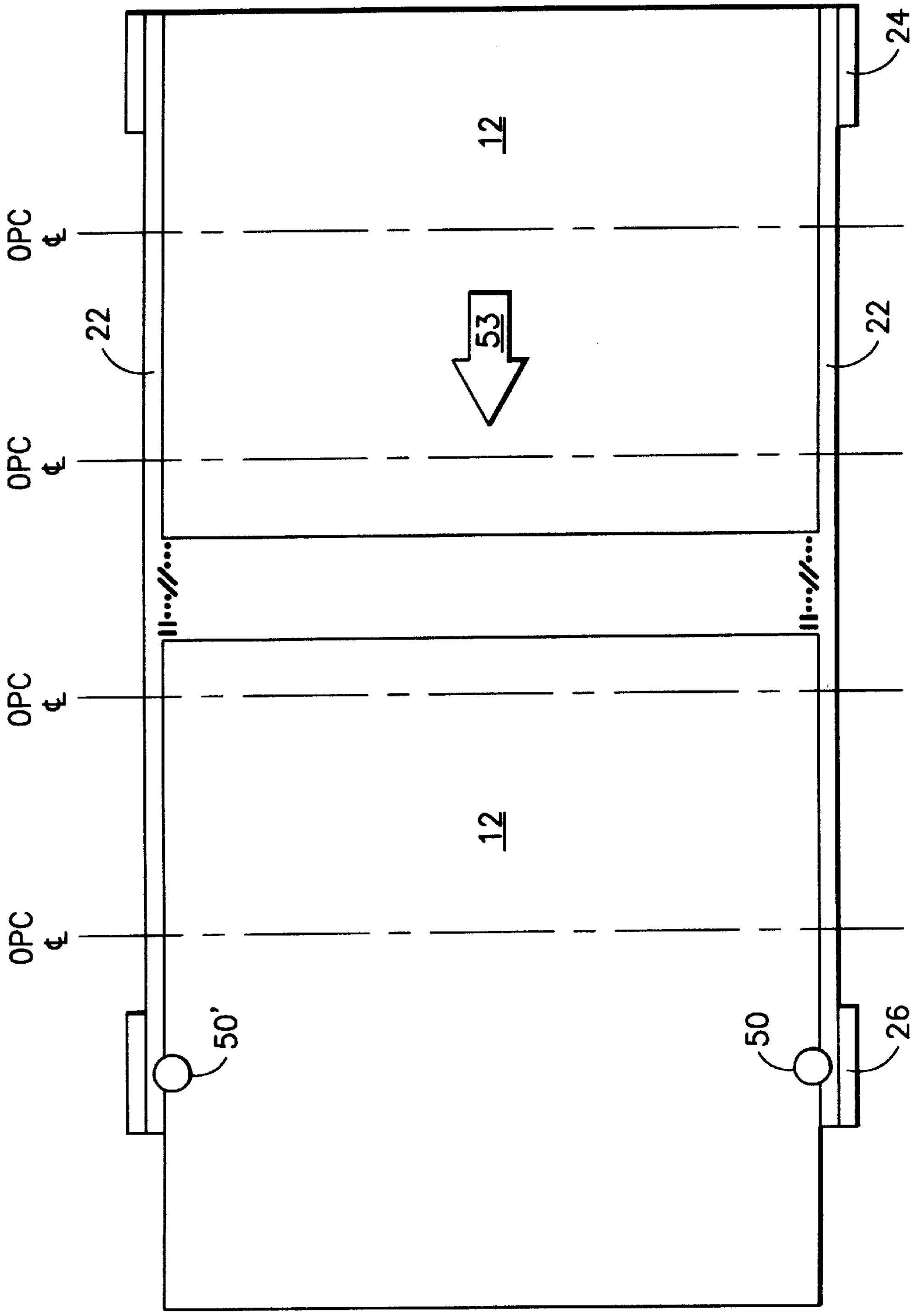
FIG. 2 is a plan view of a media transport belt showing the relative positions of optical sensors and alignment marks that are positioned on the belt.

FIG. 2 illustrates a plan view of media transport belt 22 with a pair of media sheets 12 positioned thereon. Optical sensors 50 and 50' are positioned close to belt drive roller 26 and interrogate a single pixel strip along transport belt 22. The center lines of the respective OPC rollers are illustrated by the dashed lines that are transverse to transport belt 22.

As indicated above, each developer station writes four alignment marks onto transport belt 22, two of which are orthogonal to process direction 53 and two of which are slanted with respect to process direction 53. The marks shown in FIG. 2 are representative of when only two of four developer stations have been passed, with the remaining developer stations yet to print their alignment marks on transport belt 22.

Figure 3:
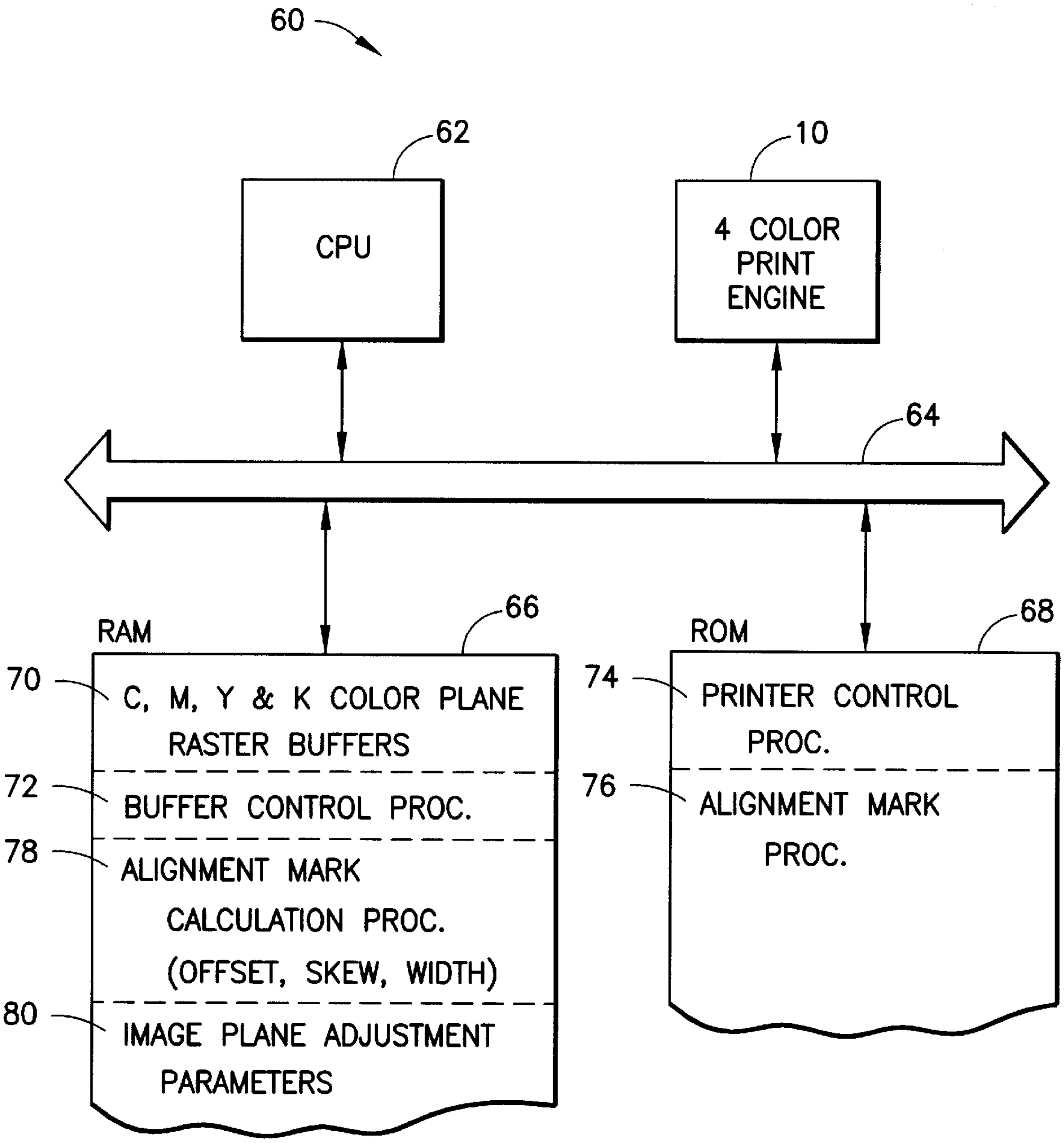
FIG. 3 is a high level block diagram of a controller which, in combination with the print engine of FIG. 1, performs the invention hereof.

Turning now to FIG. 3, a high level block diagram is shown of a controller 60 which is utilized to operate print engine 10 and, further, to control the color subimage alignment process that comprises the invention hereof. Controller 60 includes a central processing unit (CPU) 62 which communicates via a bus system 64 with print engine 10, a random access memory (RAM) 66 and a read only (ROM) 68. For exemplary purposes, it will be assumed that certain procedures are contained within either RAM 66 or ROM 68. However, one skilled in the art will realize that such procedures are not necessarily stored as separate code segments, but may be integrated with other code that is operatable to control print engine 10. Accordingly, the specific positioning and arrangement of the code procedures is to be understood as exemplary only.

RAM 66 stores an image to be printed as individual color subimages in C, M, Y and K color plane raster buffers 70. A buffer control procedure 72 controls the output of data from color plane raster buffers 70 to print engine 10. A printer control procedure 74, in ROM 68, provides overall control of print engine 10 and institutes calls for the various procedures shown in RAM 66, as they are needed. An alignment mark procedure 76 periodically causes the alignment marks, referenced above, to be printed on transfer belt 22. Alignment mark procedure 76 may be caused to operate between individual media sheets passing through print engine 10 or intermittently, as the need arises.

An alignment mark calculation procedure 78 (in RAM 66) is invoked to calculate timing and timing variations of the sensed alignment marks and to further derive adjustment parameters that are stored in image plane adjustment parameters region 80 of RAM 66. Those adjustment parameters are utilized to control buffer control procedure 72 so that any offset, skew, or width variations that are sensed for an image color plane are corrected by alteration of image data flow from color plane raster buffers 70.

Figure 4:
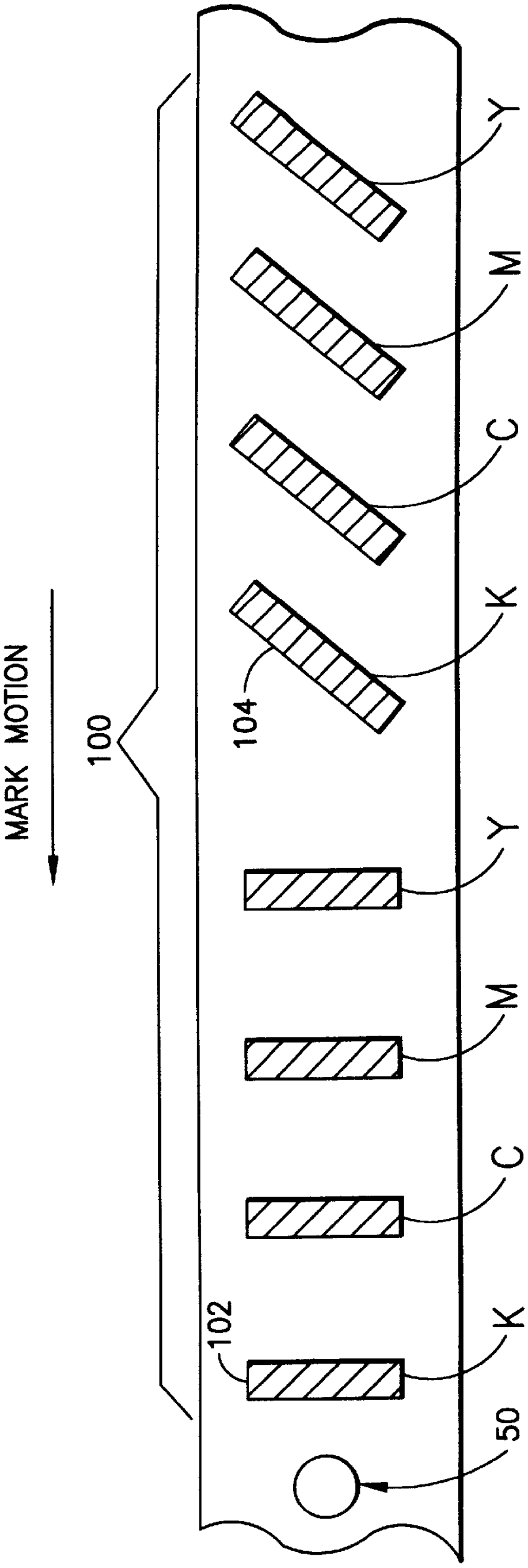
FIG. 4 is a further detailed view of the alignment marks and positioning of an optical sensor with respect thereto.

Turning now to FIG. 4, a detailed view is shown of printed alignment marks 100. One group of alignment marks is positioned on a side of transport belt 22 that is near the start of the laser scan position and another group of alignment marks is positioned on a side of transport belt 22 that is near the end of the laser scan position (only one side is shown). Alignment marks 100 comprises four sets of marks, each set including four marks. Two marks of each set are oriented parallel to the laser scan direction (and orthogonal to the process direction), and the other two marks of a set are oriented at an angle to both the laser scan direction and the process direction. A pair of marks 102, (that are orthogonal to the process direction) and a pair of slanted marks 104 comprise a set that are printed by each developer station on transport belt 22.

An optical sensor 50 is mounted in a fixed position above one side of transport belt 22 and another optical sensor is similarly positioned over the other side. The positioning of optical sensors 50 and 50' is such that each is directly over the centerline of the respective set of printed alignment marks 100. Each optical sensor preferably comprises a blue light emitting diode, as all toner colors respond well to its wavelength. A photodiode (not shown) is used as the photodetector and a lens is used to focus the alignment mark image plane onto the photodiode as transport belt 22 moves each alignment mark beneath an optical sensor 50, 50'.

Figure 5:
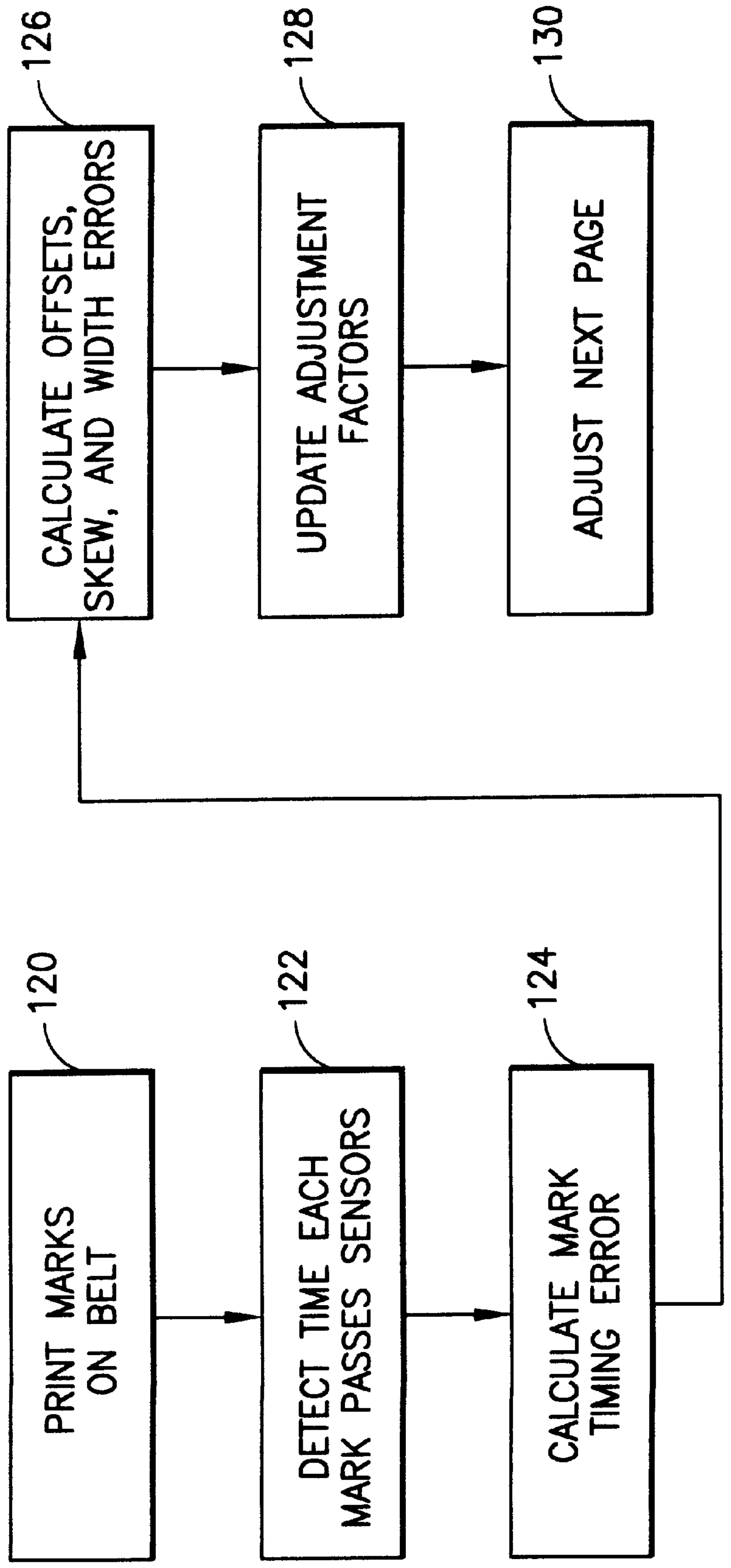
FIG. 5 is a logical flow diagram illustrating the operation of the invention.

FIG. 5 illustrates a high level logic flow diagram that describes the procedure employed for deriving offset, skew and width errors for each of the color plane images. Initially, each developer station is caused to print a set of alignment marks onto transport belt 22 (step 120). Thereafter, as each mark passes a respective optical sensor 50, 50', the time of its passage is sensed (step 122). Using, for instance, the black marks as reference marks, any offset in the expected time of arrival of subsequent alignment marks to the alignment marks printed by the black developer station is calculated as a "timing error" for the sensed marks (step 124). Next, any offset, skew and/or width errors are calculated (step 126) based upon the timing error values calculated in step 124. Using the calculated error values, adjustment factors are calculated (step 128) and are stored in image plane adjustment parameters region 80 of RAM 66. Thereafter, (step 130) the adjustment parameters are utilized by buffer control procedure 72 to control data flow from the respective color planes to the laser scanners in such a manner as to reduce the calculated misalignment parameters.

Figure 6:
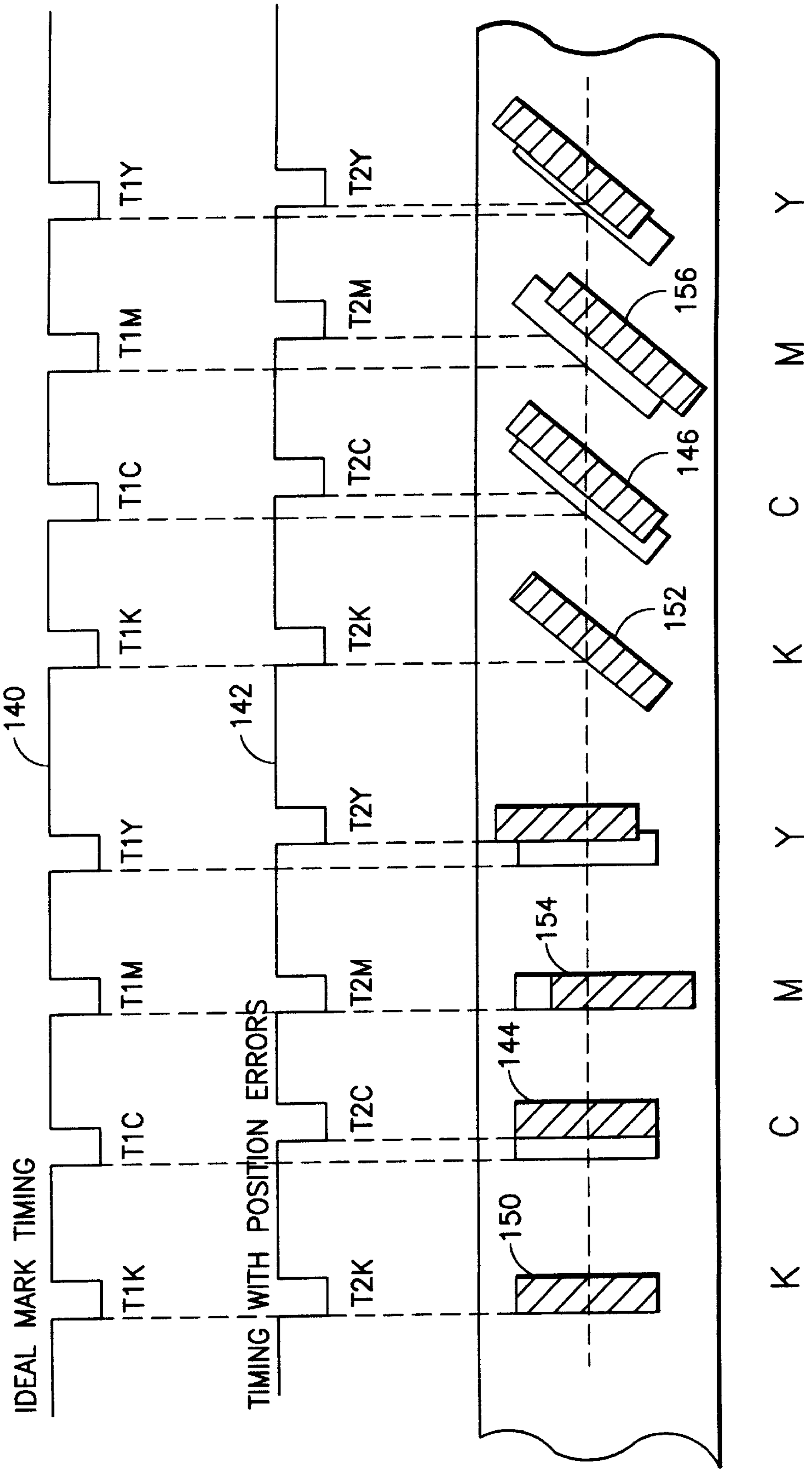
FIG. 6 is a plan view of alignment marks and indicates positional errors of individual color plane images and the timing position errors that are derived from signals generated by passage of the alignment marks beneath an optical sensor.

FIG. 6 shows the effect of image plane misalignments on alignment mark positions. The black (K) mark set is used for reference positioning. In the example shown in FIG. 6, the alignment marks printed by the Cyan (C) developer station are offset in the process direction only. The Magenta (M) plane alignment marks are offset in the scan direction only and the Yellow (Y) plane alignment marks are offset in both the process and the scan direction. Timing pulse waveforms 140 and 142 respectively illustrate outputs from optical sensor 50 (in a first case 140) when all of the alignment marks are perfectly positioned and (in second case (142) when alignment errors are present.

The sensed pulse variations are utilized to calculate four alignment error values, i.e., X-position or scan direction error, Y-position or process direction error, image width error and image skew error.

To calculate the Y-position error (process direction), note that cyan alignment marks 144 and 146 both show process direction misalignments (with the shaded areas being the actual sensed alignment marks and the outlined areas illustrating proper positioning of the marks). The Y-position error is calculated by subtracting the mark expected time T1C from the actual mark time T2C. This difference is multiplied by the speed of transport belt 22 to give a process direction error. Process direction errors for the magenta and yellow image planes are derived in a similar manner. Recall that alignment marks 150 and 152, printed by the K developer station, are utilized to determine the reference timing.

Skew error is the error which results from a lack of parallelism between scan lines of one image plane relative to scan lines of the black image plane. To determine skew error, the process direction position error values from each side of media transport belt 22 are compared. The skew error is the process direction error from one side subtracted from the process direction error of the opposite side.

X-position error is misalignment of an image plane in a direction that is orthogonal to the process direction. The angled alignment marks produced by each developer station are utilized to determine the X-position error. In FIG. 6, magenta marks 154 and 156 are shown with X-position errors only. It can be seen that angled alignment mark 156 shows an X-position error while alignment mark 154 does not. Accordingly, the timing difference is derived from the sensing of angled alignment marks 156 which enables a timing difference T2M-T1M to be sensed. This difference varies with process position errors, however, the process position error is already known from the process position error calculations and can be subtracted out, leaving the X-position error only. Accordingly, the X-position error is expressed: (T2M-T1M) (s/k)−Y error, where: s is the media transport belt speed and k is a constant, dependent upon the angle of angled alignment marks 156. If the angled alignment marks are positioned at 45° to the process direction, the constant is equal to one, otherwise, the constant is equal to the tangent of the mark angle.

Width variations from one image plane to the next are determined from differences in X-position error determined from a timing signal derived from alignment marks on one side of transport belt 22, as compared with the timing signals derived from angled alignment marks on the other side of transport belt 22. The difference in width errors from one side to the opposite side is the width error.

Corrections are made to each colored image plane based on the detected errors to insure that the remaining image planes align to the black image plane. Corrections are made for all four of the errors described above in the following manner:

X-Position Error: Laser scanners require a start-of-scan optical detector to indicate the beginning of each scan line. The starting point for each image plane is determined by a fixed number of clock cycles after the scan detect signal has been received. The X-position error is corrected by incrementing or decrementing this constant by the number of clock cycles that occur between scan detect and image start. The formula for the change required for this constant is: Cycles=Fclock*Xerror/Scan Velocity, where Fclock is the clock frequency and scan velocity is the velocity of the scan beam.

Y-Position Error: Laser printers determine the top of each page from a fixed number of scan cycles after a start-of-page signal has been detected. This value is different for each scanner in a single pass printer based on the timing between each color developer station. Y-position error correction adjusts this start position based on the measured error. The correction to the number of scan cycles delay is equal to: Y error * scan resolution. For example, if Y error=0.015 inch and the scan resolution is 1200 scan lines per inch, then the correction is 1200 * 0.015=18 lines.

Width Error: Width error is corrected by changing the spacing between dots in the scan line. This can be accomplished by varying the frequency of the data clock or preferably by inserting or subtracting spaces at fixed increments. The capability exists in laser printers for subpixel modulation. A pixel is divided into subpixels to allow dot shifting, gray scaling, curve smoothing, etc. Typically, a pixel is divided into 64 subpixels. To compensate for width error, a subpixel can be added or subtracted at calculated intervals to correct for the error. Changing a pixel by such a small amount is not perceivable in the image, but corrects for the error.

For example, if the width between sensors is 8.0 inches, then at 1200 dots per inch, 1200×8 or 9,600 dots exist between the sensors. The total number of subpixels is 9,600 * 64 or 614,400. Each subpixel is about 13 microinches wide. Correction for width error needs to occur at a subpixel increment determined by the width between sensors, divided by the width error. If the width error is determined to be 0.010 inch, then the correction increment is 8.0/0.010=800. A subpixel is then added every 800 subpixel to correct for the width error.

Skew Error: Skew error correction requires a buffering of a predetermined number of rows of raster pixel data and retrieving the data by jumping from row to row at increments based on the measured skew. For example, if the printer is designed such that the maximum skew error that can occur is 0.020 inches, at 1200 scan lines per inch resolution, 0.020 * 1200=24 lines of data need to be buffered. The number of jump points is determined by the skew error divided by the row spacing. For example, if the skew error is measured to be 0.010 inch and the row spacing 1/1200 inch, then the number of jump points required is 0.010 * 1200=12. Raster pixel data is then pulled from row buffers by jumping to a new row buffer at width increments determined by total width/number of jump points or 8/12=0.67 inch for this example, with 8.0 inches being the width. Several algorithms for jumping from row to row in the buffered data can be devised by those skilled in the art, by varying how the data is either written into the buffers or pulled from the buffers or a combination thereof.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for controlling a multicolor printer to align plural color plane subimages in an image printing process, said printer including a sequence of different color developer modules, a laser scanner associated with each color developer module, belt means for moving media sheets past said color developer modules in a process direction, a pair of sensors for sensing marks on said belt means and a controller for controlling operations of said printer, said method comprising the steps of:

a) controlling, during a print action, each said laser scanner and associated color developer module to print a set of plural alignment marks on said belt means, each said set of plural alignment marks positioned transversely to said process direction and comprising a first pair of multipixel lines that are oriented transverse to said process direction and a second pair of multipixel lines that are oriented at oblique angles to said process direction;

b) detecting times at which said sensors sense corresponding marks of each set of said plural alignment marks printed by each of said color developer modules;

c) determining variations from expected sense times of said corresponding marks of each said set of said plural alignment marks, said variations determined by comparing said sense times to expected sense times, using as a base, a set of plural alignment marks printed by one of said developer modules; and d) controlling data feed from said color plane subimages to one or more laser scanner(s) to reduce said variations during a subsequent print action.

2. The method as recited in claim 1, wherein said set of plural alignment marks printed by one of said color developer modules are those printed by a color developer module with black toner.

3. The method as recited in claim 1, wherein step d) derives said controlling action by employing said set of plural alignment marks that are oriented transverse to said process direction to determine color plane subimage offset and skew in the process direction, and said second pair of multipixel lines that are oriented at oblique angles to said process direction to determine color plane subimage width variations transverse to said process direction.

4. A system for controlling color plane subimages alignment in a multicolor printer, said system comprising:

a sequence of different color developer modules;

a laser scanner associated with each color developer module;

belt means for moving media sheets past said color developer modules in a process direction;

sensor means for sensing alignment marks on said belt means; and controller means for controlling during a print action, each said laser scanner and associated color developer module (i) to print a set of plural alignment marks on said belt means, said set positioned transverse to said process direction and including plural alignment marks, said set of plural alignment marks printed by each of said color developer modules comprising a first pair of multipixel lines that are oriented transverse to said process direction and a second pair of multipixel lines that are oriented at oblique angles to said process direction, (ii) to detect times at which said sensor means senses corresponding alignment marks of each set of said plural alignment marks printed by each of said color developer modules, (iii) to determine variations from expected sense times of said corresponding marks of each said set of said plural alignment marks by comparing said sense times to expected sense times, using as a base, a set of plural alignment marks printed by one said color developer module, and (iv) to control data feed from said color plane subimages to one or more laser scanner(s) to reduce said variations during a subsequent print action.

5. The system as recited in claim 4, wherein said set of plural alignment marks printed by one of said color developer modules are those printed by a color developer module with black toner.

6. The system as recited in claim 4, wherein said sensor means comprises two sensors positioned transversely to said belt means and after said color developer modules in said process direction.

7. The system as recited in claim 4, wherein said controller means determines how to control said data feed by employing said set of plural alignment marks that are oriented transverse to said process direction to determine color plane subimage offset and skew in the process direction, and said second pair of multipixel lines that are oriented at oblique angles to said process direction to determine color plane subimage width variations transverse to said process direction.

* * * * *